United States Patent
Nagawade et al.

(10) Patent No.: US 9,197,535 B1
(45) Date of Patent: Nov. 24, 2015

(54) SIMULTANEOUS P2P AND NON-P2P COMMUNICATIONS

(71) Applicant: Marvell International Ltd., Hamilton (BM)

(72) Inventors: Deepak Shahaji Nagawade, Aundh (IN); Sarang Shrikrishna Wagholikar, Sunnyvale, CA (US); Sudhanshu Singh, Hadapsar (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 346 days.

(21) Appl. No.: 13/720,498

(22) Filed: Dec. 19, 2012

Related U.S. Application Data

(60) Provisional application No. 61/578,586, filed on Dec. 21, 2011.

(51) Int. Cl.
*G06F 15/173* (2006.01)
*H04L 12/751* (2013.01)

(52) U.S. Cl.
CPC ..................... *H04L 45/02* (2013.01)

(58) Field of Classification Search
USPC ......... 709/201, 202, 203, 204, 217, 218, 219, 709/223, 224, 225, 226, 227, 228, 229; 370/254, 310, 328, 330, 350, 431, 252, 370/255, 312, 329, 338, 491, 503; 455/41.2, 434, 450, 515, 69
See application file for complete search history.

(56) References Cited

U.S. PATENT DOCUMENTS

| | | | |
|---|---|---|---|
| 5,740,167 A | 4/1998 | Taketsugu et al. | |
| 7,512,089 B2 | 3/2009 | Wybenga et al. | |
| 7,515,945 B2 | 4/2009 | Ruuska et al. | |
| 7,535,884 B2 | 5/2009 | Stephenson et al. | |
| 7,599,346 B2 | 10/2009 | Brommer | |
| 7,814,322 B2 | 10/2010 | Gurevich et al. | |
| 2002/0147819 A1 | 10/2002 | Miyakoshi et al. | |
| 2005/0053015 A1 | 3/2005 | Jin et al. | |
| 2007/0171922 A1 | 7/2007 | Jabri et al. | |
| 2007/0297352 A1 | 12/2007 | Jabri et al. | |
| 2008/0092204 A1 | 4/2008 | Bryce et al. | |
| 2008/0112334 A1* | 5/2008 | Laroia et al. ................. 370/254 |
| 2009/0103501 A1 | 4/2009 | Farrag et al. | |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Saket K Daftuar

(57) ABSTRACT

After determining that a P2P discovery process is to commence, one or both of (i) at least a portion of the P2P discovery process is delayed to permit communication via a non-P2P communication link, or (ii) at least a portion of the P2P discovery process is not performed to permit communication via the non-P2P communication link. Communications are performed via the non-P2P communication link during a time period that, prior to delaying or deciding not to perform the portion of the P2P discovery process, would have been allocated for the P2P discovery process.

14 Claims, 6 Drawing Sheets

(56) References Cited

U.S. PATENT DOCUMENTS

| | | | |
|---|---|---|---|
| 2009/0310619 A1 | 12/2009 | Brommer | |
| 2009/0323648 A1* | 12/2009 | Park et al. | 370/338 |
| 2010/0322213 A1* | 12/2010 | Liu et al. | 370/338 |
| 2012/0134349 A1* | 5/2012 | Jung et al. | 370/338 |
| 2012/0250531 A1* | 10/2012 | Patil et al. | 370/252 |
| 2013/0010661 A1* | 1/2013 | Esteves et al. | 370/310 |
| 2013/0065627 A1* | 3/2013 | Jung et al. | 455/515 |
| 2013/0148545 A1* | 6/2013 | Jung et al. | 370/255 |

OTHER PUBLICATIONS

Chen, "Home Network Basis: Transmission Environments and Wired/Wireless Protocols," Prentice Hall, pp. 1-26 (Jul. 2003).

Hiertz, et al., "The IEEE 802.11 Universe," *IEEE Communications Magazine*, pp. 62-70, (Jan. 2010).

"Wi-Fi Peer-to-Peer (P2P) Technical Specification, Version 1.00", Wi-Fi Alliance, pp. 1-135, Dec. 1, 2009.

van Nee, et al. "The 802.11n MIMO-OFDM Standard for Wireless LAN and Beyond," Wireless Personal Communications, vol. 37, pp. 445-453 (Jun. 2006).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., (1999).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., (Jun. 12, 2007).

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," The Institute of Electrical and Electronics Engineers, Inc., (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," The Institute of Electrical and Electronics Engineers, Inc., Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., Apr. 2003.

S. A. Mujtaba, "IEEE P802.11—Wireless LANS, TGn Sync Proposal Technical Specification," The Institute of Electrical and Electronics Engineers, Inc., doc.: IEEE 802.11-04/0889r6, May 2005.

* cited by examiner

SIMULTANEOUS P2P AND NON-P2P COMMUNICATIONS

CROSS-REFERENCES TO RELATED APPLICATION

This disclosure claims the benefit of U.S. Provisional Patent Application No. 61/578,586, entitled "Simultaneous Operation: P2P and non P2P Connections," filed on Dec. 21, 2011, which is hereby incorporated by reference herein in its entirety.

FIELD OF THE DISCLOSURE

The present disclosure relates generally to communication networks and, more particularly, to simultaneous peer-to-peer (P2P) and non-P2P communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Different topologies for wireless communication are now provided. For example, a wireless local area network (WLAN) operating in an infrastructure mode typically includes an access point (AP) and one or more client stations. In the infrastructure mode, client stations can communication with one another via the AP. On the other hand, in a peer-to-peer (P2P) mode, two client stations can directly communicate with one another without an intervening AP. Some devices are capable of simultaneously maintaining both P2P communications and non-P2P communications. For example, a client device may operate in an infrastructure-type WLAN having an AP, but may simultaneously operate a P2P connection with a P2P device. In other words, the client device can communicate with the AP, and can also communicate directly with the P2P device.

SUMMARY

In one embodiment, a method includes determining, with a communication device, that a peer-to-peer (P2P) discovery process is to commence. The P2P discovery process is for the communication device to discover one or more other communication devices capable of P2P communications. The method includes, after determining that the P2P discovery process is to commence, at least one of (i) delaying, with the communication device, at least a portion of the P2P discovery process to permit communication, by the communication device, via a non-P2P communication link, or (ii) not performing at least a portion of the P2P discovery process to permit communication, by the communication device, via the non-P2P communication link. The method also includes performing communications, with the communication device, via the non-P2P communication link during a time period that, prior to the act of delaying or deciding not to perform, would have been allocated for the P2P discovery process.

In another embodiment, a communication device comprises a network interface configured to determine that a peer-to-peer (P2P) discovery process is to commence, wherein the P2P discovery process is for the communication device to discover one or more other communication devices capable of P2P communications. The network interface is also configured to, after determining that the P2P discovery process is to commence, at least one of (i) delay at least a portion of the P2P discovery process to permit communication, by the communication device, via a non-P2P communication link, or (ii) not perform at least a portion of the P2P discovery process to permit communication, by the communication device, via the non-P2P communication link. The network interface is also configured to perform communications via the non-P2P communication link during a time period that, prior to the act of delaying or deciding not to perform, would have been allocated for the P2P discovery process.

In yet another embodiment, a method includes allocating, with a communication device, a first portion of a listen time period of a peer-to-peer (P2P) discovery process. The listen time period of the P2P discovery process is allocated for the communication device (i) to listen, on a first channel, for one or more probes, when transmitted, from one or more other communication devices capable of P2P communications, and (ii) to transmit, via the first channel, one or more responses to the one or more probes on the first channel. The method also includes allocating, with the communication device, a second portion of the listen time period of the P2P discovery process and allocating, with the communication device, at least one non-P2P communication time period between (i) the first portion of the listen time period and (ii) the second portion of the listen time period. The method additionally includes listening, with the communication device, for one or more probes received via the first channel during the first portion of the listen time period of the P2P discovery process, wherein the one or more probes are transmitted by one or more other communication devices capable of P2P communications and at least one of (i) transmitting or (ii) receiving, with the communication device, via the non-P2P communication link during the at least one non-P2P communication time period. Further, the method includes listening, with the communication device, for one or more probes received via the second channel during the second portion of the listen time period of the P2P discovery process, wherein the one or more probes, when transmitted, are from one or more other communication devices capable of P2P communications and in response to one or more probes received, via the second channel, during the second portion of the listen time period of the P2P discovery process, transmitting, with the communication device, one or more responses via the second channel.

In a further embodiment, a communication device comprises a network interface configured to allocate a first portion of a listen time period of a peer-to-peer (P2P) discovery process, wherein the listen time period of the P2P discovery process is allocated for the communication device (i) to listen, on a first channel, for one or more probes, when transmitted, from one or more other communication devices capable of P2P communications, and (ii) to transmit, via the first channel, one or more responses to the one or more probes on the first channel. The network interface is also configured to allocate a second portion of the listen time period of the P2P discovery process, and allocate at least one non-P2P communication time period between (i) the first portion of the listen time period and (ii) the second portion of the listen time period. The network interface is further configured to listen for one or more probes received via the first channel during the first portion of the listen time period of the P2P discovery process, wherein the one or more probes are transmitted by one or more other communication devices capable of P2P communications, and at least one of (i) transmit or (ii) receive, via the non-P2P communication link, during the at least one non-P2P communication time period. Additionally, the network interface is configured to listen for one or more probes received via the second channel during the second portion of the listen time period of the P2P discovery process, wherein the one or more probes, when transmitted, are from one or more other communication devices capable of P2P communications, and in response to one or more probes received, via the second channel, during the second portion of the listen time period of the P2P discovery process, transmit one or more responses via the second channel.

In yet another embodiment, a method includes performing non peer-to-peer (P2P) communications with a communication device on a first channel, and determining, using the communication device that a P2P discovery process is to be performed by the communication device. Additionally, the method includes, in response to determining that the P2P discovery process is to be performed, switching the communication device from the first channel to a second channel, wherein the communication device is configured to use the second channel for listening for P2P probe signals during a listen phase of the P2P discovery process. The method also includes, after switching the communication to the second channel, performing, with the communication device, non P2P communications on the second channel. The method further includes, during the listen phase of the P2P discovery process, (i) listening for probe signals on the second channel and (ii) transmitting and/or receiving non-P2P communications on the second channel.

In still another embodiment, a communication device comprises a network interface configured to perform non peer-to-peer (P2P) communications on a first channel, and determine that a P2P discovery process is to be performed by the communication device. The network interface is also configured to, in response to determining that the P2P discovery process is to be performed, switch from the first channel to a second channel. The network interface is further configured to use the second channel for listening for P2P probe signals during a listen phase of the P2P discovery process. Additionally, the network interface is configured to perform non P2P communications on the second channel after switching the communication to the second channel, and during the listen phase of the P2P discovery process, (i) listen for probe signals on the second channel and (ii) transmit and/or receive non-P2P communications on the second channel.

DETAILED DESCRIPTION

Various techniques for permitting a wireless network device to discover and/or establish connections with a peer-to-peer (P2P) communication device while maintaining a non-P2P connection, such as a connection in a wireless local area network (WLAN) infrastructure network, are described below, according to various embodiments.

Figure 1:
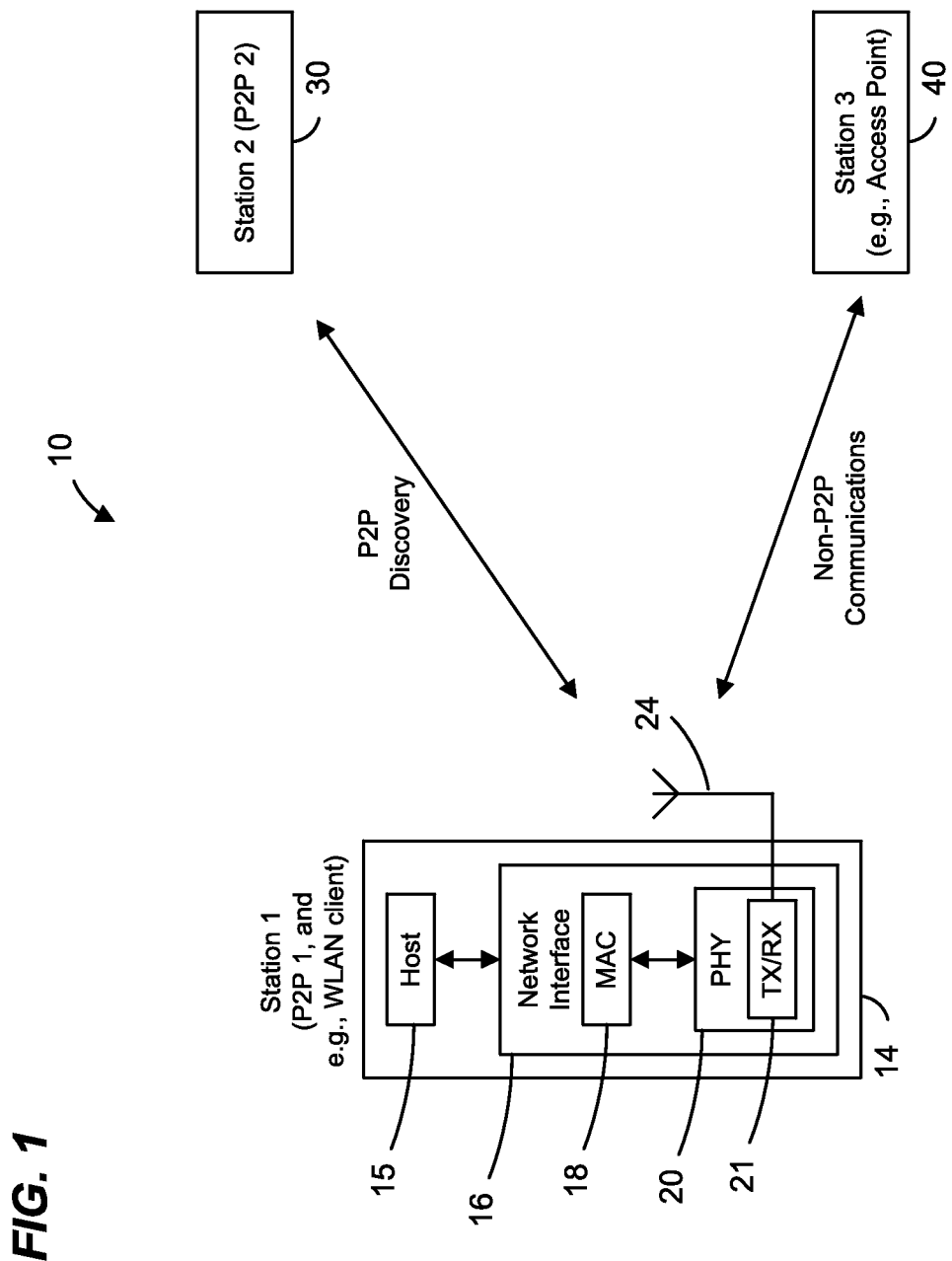
FIG. 1 is a block diagram of an example wireless communication network, according to an embodiment.

FIG. 1 is a block diagram of an example wireless communication network 10, according to an embodiment. A communication device 14 (Station 1) includes a host processor 15 coupled to a network interface 16. The network interface 16 includes a medium access control (MAC) processing unit 18 and a physical layer (PHY) processing unit 20. The PHY processing unit 20 includes a transceiver 21, which coupled to an antenna 24. Although one antenna 24 is illustrated in FIG. 1, the communication device 14 can include different numbers (e.g., 2, 3, 4, 5, etc.) of antennas 24 in other embodiments. For example, the communication device 14 includes multiple antennas 24 and employs antenna switching and/or transmit/receive diversity.

The network interface 16 is configured to establish one or more P2P connections with other communication devices while maintaining a non-P2P connection, such as a connection in a WLAN infrastructure network. In an embodiment, the network interface 16 is configured to operate as a client in a WLAN. In another embodiment, the network interface 16 is configured to operate as an AP in a WLAN.

The network 10 includes a communication device 30 (Station 2). The communication device 30 is configured to perform P2P communications. In an embodiment, the communication device 30 has a structure the same as or similar to the communication device 14. In other embodiments, the communication device 30 has another suitable structure.

The network 10 also includes a communication device 40. The communication device 40 is configured to perform non-P2P communications. In an embodiment, the communication device 40 has a structure similar to the communication device 14. In other embodiments, the communication device 40 has another suitable structure. In an embodiment, the communication device 40 is configured to operate as an AP in a WLAN. In another embodiment, the communication device 40 is configured to operate as a client in a WLAN.

In one example scenario, the communication device 40 operates as an AP in the WLAN, and the communication device 14 operates as a client in the WLAN. In another example scenario, the communication device 10 operates as the AP in the WLAN, and the communication device 40 operates as a client in the WLAN.

In a traditional P2P discovery process, a P2P device enters a discovery process that includes "search" and "listen" phases. In the search phase, the P2P device scans through a series of multiple social channels in order, sending probe signals over the social channels to other P2P devices. After completing the search phase, the P2P device enters a listen phase in which the P2P device listens for probe signals from other P2P devices. If a P2P device is capable of performing non-P2P operations, the non-P2P operations are typically delayed until the find phase is complete. The non-P2P operations may also be delayed until both the search phase and the listen phase are complete.

Figure 2:
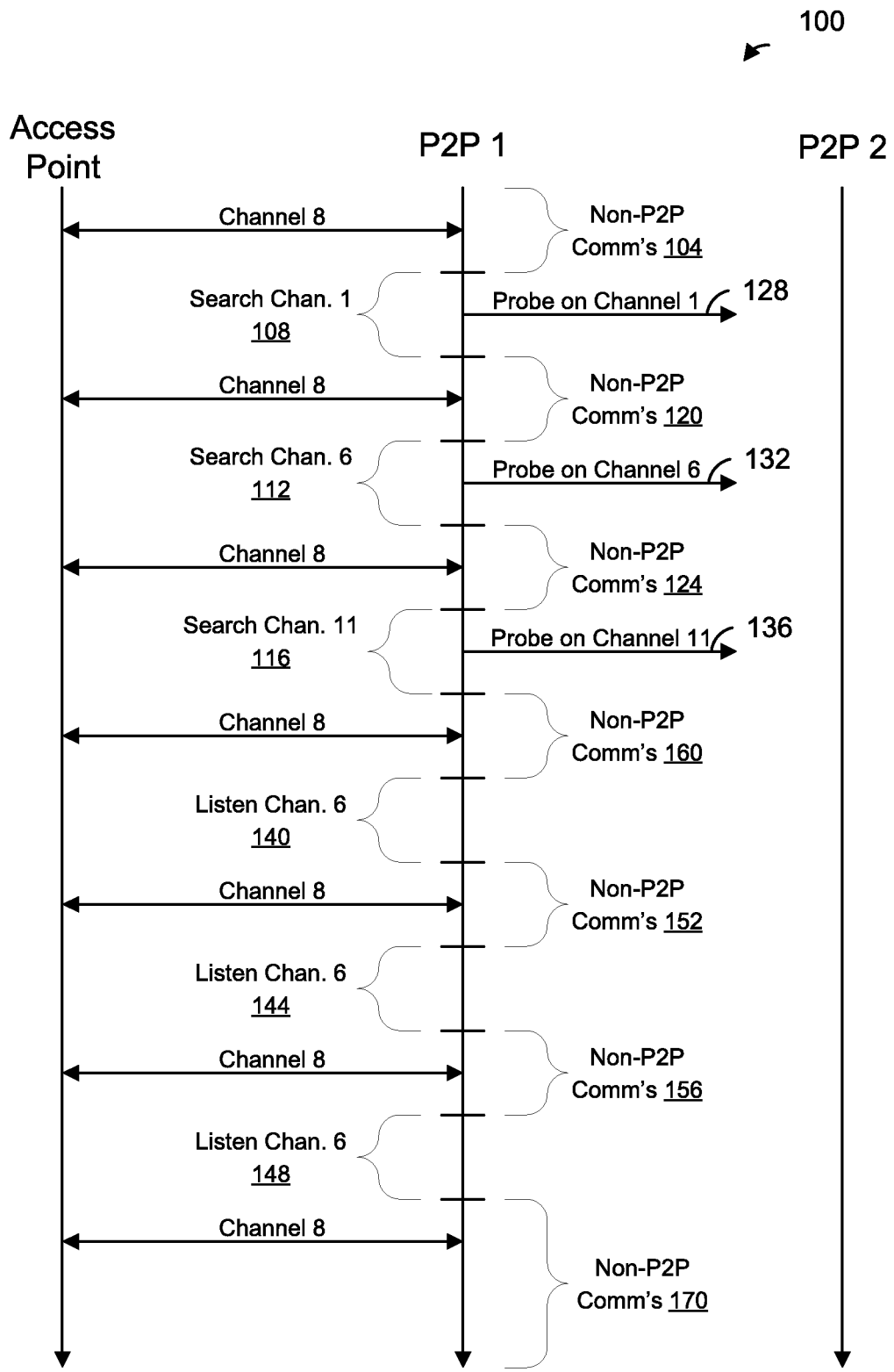
FIG. 2 is a timing diagram illustrating an example scenario of communications in the wireless communication network of FIG. 1, according to an embodiment.

FIG. 2 is a timing diagram illustrating an example scenario of communications in a wireless communication network, according to an embodiment. The example timing diagram 100 and the signals illustrated therein will be described with reference to an example communication network that is similar to network 10 of FIG. 1 for ease of explanation and illustration. However, it is noted, in light of the teachings and disclosure herein, that the communications illustrated by the example timing diagram 100 are, in various other embodiments, implemented by networks other than the network 10. Similarly, in various embodiments, network system 10 operates in a manner that generates signals and/or signal states different from those shown in the example timing diagram 100.

With particular reference to FIG. 2, the timing diagram 100 illustrates communications in the network 10 between a first P2P device (P2P1), such as communication device 14, and a non-P2P device (Access Point), similar to access point 40, according to an embodiment. P2P1 attempts to discover another P2P device, e.g., a second P2P device (P2P2), such as communication device 30.

The timing diagram 100 illustrates communication operations being performed on various channels (e.g., channel 1, channel 6, and channel 11). In other embodiments, other suitable channels are utilized, and/or other suitable numbers of channels are utilized. The timing diagram 100 illustrate various time periods 104, 108, 112, 116, 120, 124, 140, 144, 148, 152, 156 and 160. In an embodiment, each of these periods is equal in time and has a length of 100 ms. In other embodiments, the periods differ from each other in length and/or represent time periods having suitable lengths longer or shorter than 100 ms (e.g., 50 ms, 150 ms, 200 ms, 250 ms, etc.). In some embodiments, some periods have the same length while others have a different length.

At the start of timing diagram 100, it is assumed that P2P1 has an already established non-P2P connection with an access point (AP) on channel 8, and that it has already been determined that P2P1 is to attempt to discover other P2P devices. In an embodiment, P2P1 delays attempts to discover P2P devices in order to first perform non-P2P communications with the AP. Thus, P2P1 determines to delay starting to discover P2P devices for a time period 104. During time 104, P2P1 performs, instead, non-P2P communications with the AP on channel 8.

After time period 104, P2P1 starts a P2P search phase, which includes transmitting probe signals on P2P social channels and listening for responses to the probe signals from other P2P devices. For example, the search phase generally involves three time periods 108, 112, and 116. In an embodiment, the entire search phase is not over a contiguous time period. Rather, in an embodiment, the search phase is non-contiguous in time, and is interspersed with one or more time periods in which P2P1 reverts to non-P2P communications with the AP. For example, non-P2P communication time periods 120 and 124 are interspersed between time P2P search phase periods 108, 112, and 116, as will be described in more detail below. This improves the ability of P2P1 to maintain the existing connection with the AP and/or to decrease non-P2P communication delays occurring over the non-P2P connection during the P2P search phase, at least in some embodiments and/or scenarios.

At time period 108, P2P1, acting as part of the P2P search phase, switches to a first P2P social channel (channel 1) and transmits a probe signal 128 on channel 1 in an attempt to connect with another P2P device (e.g., P2P2). In an embodiment, P2P1 transmits the probe signal 128 at or near the beginning of the time period 108 and spends the remainder of the time period 108 listening for responses to the probe signal 128 from one or more other P2P devices (e.g., P2P2). In other embodiments, P2P1 transmits the probe signal 128 at a different time and/or transmits multiple probe signals during the time period 108. In the example scenario illustrated in FIG. 2, P2P1 does not receive a response to the probe signal 128. If, however, P2P1 receives a response to the probe signal 128 from another P2P device, such as P2P2, the process illustrated in timing diagram 100 will end, and if instructed to do so, the two P2P devices will enter a group owner (GO) negotiation to determine which P2P device will become the owner of a P2P group including the two devices.

After time period 108, P2P1 interrupts the search phase to perform non-P2P communications with the AP during time period 120 on a non-P2P channel (channel 8). For example, P2P1 switches to channel 8 so that it can transmit signals to the AP and/or receive signals from the AP as part of a non-P2P connection already established with the AP.

After time period 120, P2P1 continues the P2P search phase. For example, P2P1 switches to a second social channel (Channel 6) and transmits a probe signal 132 during time period 112 in an attempt to connect with another P2P device (e.g., P2P2). In an embodiment, P2P1 transmits the probe signal 132 at or near the beginning of the time period 112 and spends the remainder of the time period 112 listening for responses to the probe signal 132 from one or more other P2P devices (e.g., P2P2). In other embodiments, P2P1 transmits the probe signal 132 at a different time and/or transmits multiple probe signals during the time period 112. In the example scenario illustrated in FIG. 2, P2P1 does not receive a response to the probe signal 132. If, however, P2P1 receives a response to the probe signal 132 from another P2P device, such as P2P2, the process illustrated in timing diagram 100 will end, and if instructed to do so, the two P2P devices will enter a GO negotiation to determine which P2P device will become the owner of a P2P group including the two devices.

After time period 112, P2P1 again interrupts the search phase to perform non-P2P communications with the AP during time period 124 on a non-P2P channel (channel 8). For example, P2P1 switches to channel 8 so that it can transmit signals to the AP and/or receive signals from the AP as part of a non-P2P connection already established with the AP.

After time period 124, P2P1 continues the P2P search phase. For example, P2P1 switches to a third social channel (Channel 11) and transmits a probe signal 136 during the time period 116 in an attempt to connect with another P2P device (e.g., P2P2). In an embodiment, P2P1 transmits the probe signal 136 at or near the beginning of the time period 116 and spends the remainder of the time period 116 listening for responses to the probe signal 136 from one or more other P2P devices (e.g., P2P2). In other embodiments, P2P1 transmits the probe signal 136 at a different time and/or transmits multiple probe signals during the time period 116. In the example scenario illustrated in FIG. 2, P2P1 does not receive a response to the probe signal 136. If, however, P2P1 receives a response to the probe signal 136 from another P2P device, such as P2P2, the process illustrated in timing diagram 100 will end, and if instructed to do so, the two P2P devices will enter a GO negotiation to determine which P2P device will become the owner of a P2P group including the two devices.

After completing the search phase, P2P1 continues an attempt to discover other P2P devices by entering a listen phase, in an embodiment. The listen phase generally involves the P2P1 switching to a predetermined social channel (channel 6 in the example illustrated in FIG. 2) and then listening for probe signals transmitted by other P2P devices. During the listen phase, when a probe signal is received by P2P1, P2P1 transmits a response to the probe signal and then, if instructed to do so, enters GO negotiations as discussed above, in some embodiments. In an embodiment, the duration of the listen phase varies. In one embodiment, the duration is pseudo-randomly determined. In some embodiments, the duration is determined such that the duration falls within a range between a minimum period and a maximum period, inclusive. In some embodiments, the duration is determined as an integer multiple of the minimum period. In an embodiment, the duration is selectable from a set of different time durations. In an embodiment, the set includes the durations: 100 ms, 200 ms, and 300 ms. In an embodiment, the set consists of the durations: 100 ms, 200 ms, and 300 ms. In the example, illustrated in FIG. 2, the duration of the listen phase is 300 ms. In other embodiments and/or scenarios, the duration of the listen phase is some other suitable duration.

In an embodiment and at least in some scenarios, the entire listen phase is not over a contiguous time period. Rather, in some embodiments and/or scenarios, the listen phase is non-contiguous in time, and is interspersed with one or more time periods in which P2P1 reverts to non-P2P communications with the AP. For example, non-P2P communication time periods 152 and 156 are interspersed between time P2P listen phase periods 140, 144, and 148, as will be described in more detail below. This improves the ability of P2P1 to maintain the existing connection with the AP and/or to decrease non-P2P communication delays occurring over the non-P2P connection during the P2P listen phase, at least in some embodiments and/or scenarios. The number of periods of non-P2P communications that intersperse the listen phase depends on the length of the listen phase. For example, in an embodiment, if the listen phase has a length of 200 ms, one period of non-P2P communications interrupts the listen phase. As another example, if the listen phase has a length of 100 ms, no periods of non-P2P communications interrupts the listen phase, but rather the listen phase is contiguous.

In an embodiment, P2P1 delays a start of the listen phase. For example, in an embodiment, the P2P1 does not immediately enter the listen phase after the end of the search phase. For example, in the example illustrated in FIG. 2, P2P1 determines to delay starting the listen phase for a time period 160. During time 160, P2P1 performs, instead, non-P2P communications with the AP on channel 8. Thus, upon completing search period 116, P2P1 switches to channel 8 so that it can transmit signals to the AP and/or receive signals from the AP as part of a non-P2P connection already established with the AP.

At time period 140, P2P1 starts the listen phase. For example, P2P1 switches to the P2P listen channel (Channel 6) and listens for probe signals from other P2P devices during time period 140. When a probe signal is received by P2P1 during time period 140, the process illustrated in timing diagram 100 will end, and if instructed to do so, the two P2P devices will enter a GO negotiation to determine which P2P device will become the owner of a P2P group including the two devices, according to an embodiment.

After time period 140, P2P1 interrupts the listen phase to perform non-P2P communications with the AP during time period 152 on the non-P2P channel (channel 8). For example, P2P1 switches to channel 8 so that it can transmit signals to the AP and/or receive signals from the AP as part of a non-P2P connection already established with the AP.

After time period 152, P2P1 continues the P2P listen phase. For example, P2P1 switches to the P2P listen channel (Channel 6) and listens for probe signals from other P2P devices during time period 144. When a probe signal is received by P2P1 during time period 144, the process illustrated in timing diagram 100 will end, and if instructed to do so, the two P2P devices will enter a GO negotiation to determine which P2P device will become the owner of a P2P group including the two devices, according to an embodiment.

After time period 144, P2P1 again interrupts the listen phase to perform non-P2P communications with the AP during time period 156 on the non-P2P channel (channel 8). For example, P2P1 switches to channel 8 so that it can transmit signals to the AP and/or receive signals from the AP as part of a non-P2P connection already established with the AP.

After time period 156, P2P1 continues the P2P listen phase. For example, P2P1 switches to the P2P listen channel (Channel 6) and listens for probe signals from other P2P devices during time period 148. When a probe signal is received by P2P1 during time period 144, the process illustrated in timing diagram 100 will end, and if instructed to do so, the two P2P devices will enter a GO negotiation to determine which P2P device will become the owner of a P2P group including the two devices, according to an embodiment.

After the listen phase is complete, P2P1 again performs non-P2P communications with the AP during time period 170 on the non-P2P channel (channel 8). For example, P2P1 switches to channel 8 so that it can transmit signals to the AP and/or receive signals from the AP as part of a non-P2P connection already established with the AP. The length of time period 170 need not be the same as the length of any other periods discussed above, in some embodiments. In some embodiments, the search phase and listen phase are repeated when another P2P device is not discovered.

While time periods 152 and 156 are included in this example scenario, in other embodiments and/or scenarios, one or both of time slots 152 and 156 are omitted. For example, in another scenario, the "listen" period of device P2P1 for P2P communications is 200 ms long and divided into two 100 ms P2P listen intervals, with one 100 ms non-P2P interval interspersed between the two P2P listen intervals. In another embodiment and/or scenarios, the "listen" period of device P2P1 for P2P communications is 100 ms long and includes a single contiguous 100 ms interval, and no non-P2P time periods are interspersed within the listen period.

Whether to delay, and by how, the search time periods 108, 112, and 116 is determined based on traffic levels or demands of the non-P2P connection, in an embodiment. Similarly, in an embodiment, whether to delay, and by how, a portion of the listen time periods 140, 144, and 148 is determined based on traffic levels or demands of the non-P2P connection. For example, in an embodiment, traffic levels or demands are measured based on one or more of an amount of data buffered at P2P1 for transmission via the non-P2P link, a type of data buffered at P2P1 for transmission via the non-P2P link (e.g., a priority level associated with the data, a quality of service associated with the data, etc.), a type of data recently received by the P2P1 via the non-P2P link (e.g., a priority level associated with the data, a quality of service associated with the data, etc.), an amount of data transmitted and/or received via the non-P2P link in a recent time period, etc.

In some embodiments, it may be determined whether any of the search phase should be skipped based on traffic levels or demands of the non-P2P connection, in an embodiment. For example, in some embodiments, one or more of the search time periods 108, 112, and 116 are determined to be skipped.

Figure 3:
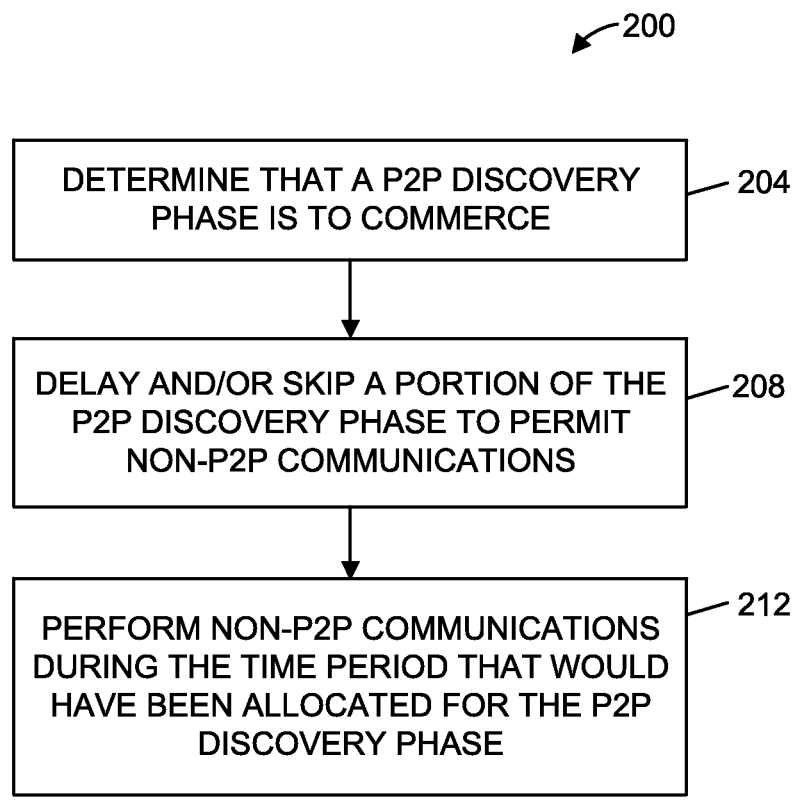
FIG. 3 is a flow diagram of an example method for performing communications via a non-P2P communication link after delaying or not performing at least a portion of a P2P discovery process, according to an embodiment.

FIG. 3 is a flow diagram of an example method for performing communications via a non-P2P communication link while attempting to discover P2P devices, according to an embodiment. The method 200 is described with reference to FIG. 2 for explanatory purposes. In other embodiments and/or scenarios, the method 200 does not correspond with the time periods shown in FIG. 2. In an embodiment, the method 200 is implemented by a device such as the communication device 14 of FIG. 1. For example, the network interface 16 is configured to implement the method 200, in an embodiment. As another example, the network interface 16 and the host 15 are configured to implement the method 200, in an embodiment. In other embodiments, the method 200 is implemented by another suitable device.

The method 200 begins at block 204 when it is determined that a P2P discovery process is to commence. The P2P discovery process allows a communication device, such as the P2P1, to discover one or more other communication devices that are capable of P2P communications. In an embodiment, block 204 occurs after non-P2P communications have taken place and when a non-P2P connection is currently established. In another embodiment, block 204 occurs when a non-P2P connection is not currently established.

At block 208, at least a portion of the P2P discovery process is delayed to permit communication via a non-P2P communication link and/or at least a portion of the P2P discovery process is skipped to permit communication via the non-P2P communication link. For example, in an embodiment, if the P2P discovery process was to begin at time t=0, start of the discovery process is delayed for some suitable time period (e.g., delay start until t=100 ms). During the delay, non-P2P communications are performed. For example, the non-P2P communications are between an AP and a client device of the AP, in an embodiment. In some embodiments different portions of P2P discovery process are delayed by different amounts of time. For example, referring to FIG. 2, the time period 108 is delayed by 100 ms, whereas the time period 140 is delayed by 400 ms. In some embodiments, the one or more portions of the discovery process are skipped or omitted. For example, in one embodiment, one or more of the search time periods 108, 112, and 116 are omitted. Whether to delay, skip any of, and how many, the search time periods 108, 112, and 116 is determined based on traffic levels or demands of the non-P2P connection, in an embodiment. For example, in an embodiment, whether to skip any, and how many, of the search time periods is determined based on one or more of an amount of data buffered at P2P1 for transmission via the non-P2P link, a type of data buffered at P2P1 for transmission via the non-P2P link (e.g., a priority level associated with the data, a quality of service associated with the data, etc.), a type of data recently received by the P2P1 via the non-P2P link (e.g., a priority level associated with the data, a quality of service associated with the data, etc.), an amount of data transmitted and/or received via the non-P2P link in a recent time period, etc.

Similarly, in an embodiment, whether to delay, and by how, any portion of the listen time periods 140, 144, and 148 is determined based on traffic levels or demands of the non-P2P connection.

As noted above, at block 208, P2P1 will either delay the scheduled P2P discovery process or avoid performing at least a portion of the scheduled P2P discovery process altogether. In an embodiment, if the P2P discovery process is merely delayed, the discovery process proceeds for the originally scheduled discovery period (e.g., 300 ms in one embodiment). In another embodiment, if some or all of the P2P discovery process is not performed, the length of the originally scheduled discovery period will be shortened accordingly.

At block 212, during the time period that would have been allocated for the P2P discovery process but for the delay and/or skipping of block 208, non-P2P communications are performed via a non-P2P communication link. For example, the non-P2P communications are between an AP and a client device of the AP, in an embodiment.

Figure 4:
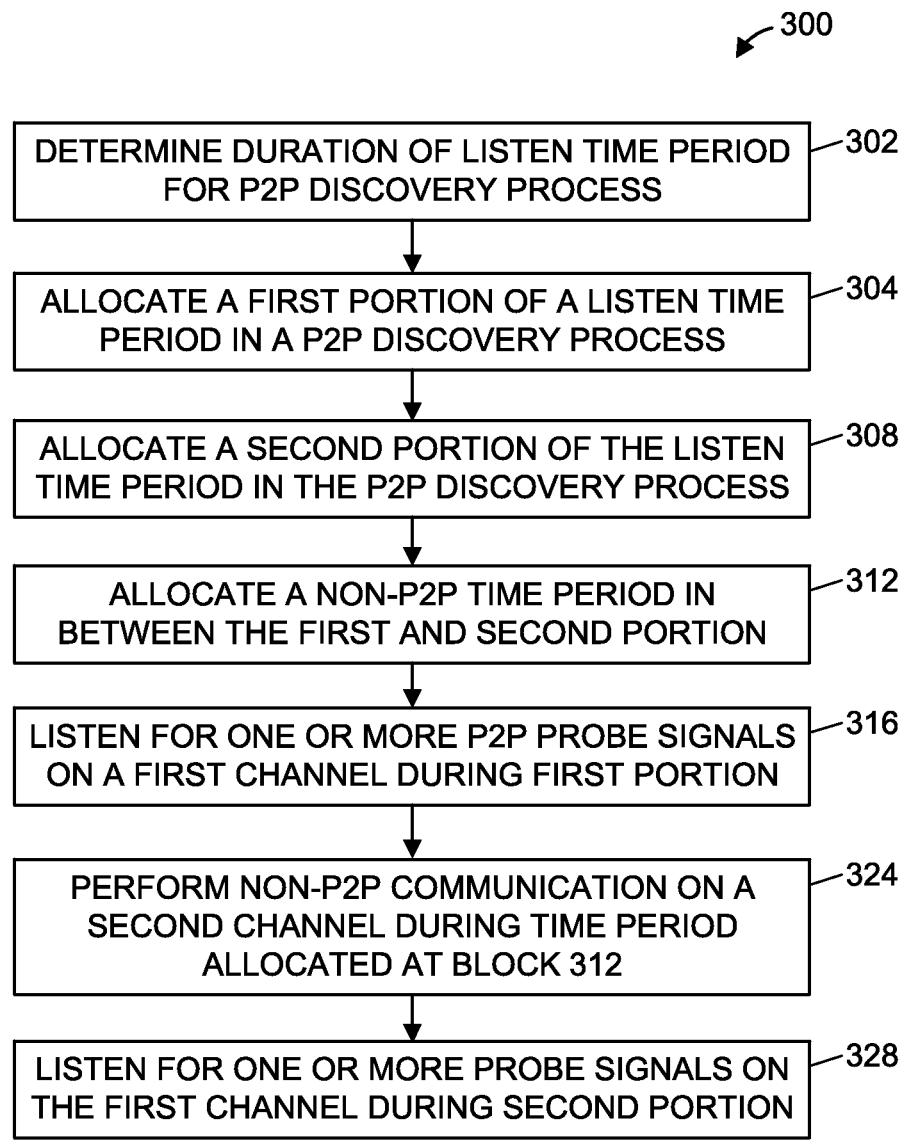
FIG. 4 is a flow diagram of an example method for performing communications via a non-P2P communication link between portions of a P2P discovery process, according to an embodiment.

FIG. 4 is a flow diagram of an example method 300 for performing communications via a non-P2P communication link in between portions of a single P2P discovery process, according another embodiment. The method 300 is described with reference to FIG. 2 for explanatory purposes. In other embodiments and/or scenarios, the method 300 does not correspond with the time periods shown in FIG. 2. For example, in the example scenario of FIG. 2, the P2P listen time period has a duration of 300 ms and is divided into three equal 100 ms segments. In other embodiments and/or scenarios, the P2P listen time period is longer than 300 ms. In other embodiments and/or scenarios, the P2P listen time period is shorter than 300 ms. In other embodiments and/or scenarios, the listen time period is divided into time segments of different lengths. In other embodiments and/or scenarios, the listen time period divided into more than or less than three segments.

In an embodiment, the method 300 is implemented by a device such as the communication device 14 of FIG. 1. For example, the network interface 16 is configured to implement the method 300, in an embodiment. As another example, the network interface 16 and the host 15 are configured to implement the method 300, in an embodiment. In other embodiments, the method 300 is implemented by another suitable device.

In some embodiments, the method 300 is performed when it is determined that traffic levels and/or demands on a non-P2P connection are at a level at which a P2P discovery process may adversely affect the non-P2P connection.

At block 302, a duration of a listen phase of a P2P discovery process is determined. As discussed above, determining duration of the P2P listen phase is determined pseudo-randomly, in an embodiment. In some embodiments, the duration is determined such that the duration falls within a range between a minimum period and a maximum period, inclusive. In some embodiments, the duration is determined as an integer multiple of the minimum period. In an embodiment, the duration is selectable from a set of different time durations. In an embodiment, the set includes the durations: 100 ms, 200 ms, and 300 ms. In an embodiment, the set consists of the durations: 100 ms, 200 ms, and 300 ms. In the example, illustrated in FIG. 2, the duration of the listen phase is 300 ms. In other embodiments and/or scenarios, the duration of the listen phase is some other suitable duration.

At block 304, a first portion of the listen phase of the P2P discovery process is allocated. Referring to FIG. 2, for example, the time period 140 is allocated.

At block 308, a second portion of the listen phase of the P2P discovery process is allocated. Referring to FIG. 2, for example, the time period 144 or the time period 148 is allocated.

The first and second portions allocated at blocks 304 and 308 correspond to different portions of the same listen phase for which a duration was determined at block 302, in an embodiment.

At block 312, at least one non-P2P communication time period is allocated between the first and second portions of the listen time period at step 312. For example, time period 152 is allocated between listen time periods 140 and 144. As another example, time periods 152 and 156 are allocated between listen time periods 140 and 148.

At block 316, P2P1 listens, on a P2P listen channel and during the first portion of the listen time period allocated at block 304, for one or more probe signals from one or more other communication devices capable of P2P communications. In some embodiments, listening at block 316 occurs after the first and second portions of the listen time period and the non-P2P communication time period have been allocated at blocks 304, 308, and 312.

At block 324, non-P2P communications are performed via a non-P2P communication link during the time period allocated at block 312. In an embodiment, block 324 includes changing from a listen channel utilized during block 316 to a non-P2P channel different than the listen channel, where the non-P2P communications occur over the non-P2P channel. In an embodiment, block 324 includes a communication device transmitting data to a non-P2P device such as an AP or a client of an AP. In an embodiment, block 324 includes receiving data from a non-P2P device such as an AP or a client of an AP. In an embodiment, block 324 includes utilizing a non-P2P connection that was established prior to the time period allocated at block 312. In an embodiment, the non-P2P communications of block 324 include, for example, negotiations between a client device and an AP to establish a connection between the client device and the AP.

At block 316, P2P1 listens, on the P2P listen channel and during the second portion of the listen time period allocated at block 308, for one or more probe signals from one or more other communication devices capable of P2P communications. In some embodiments, listening at block 328 occurs after the first and second portions of the listen time period and the non-P2P communication time period have been allocated at blocks 304, 308, and 312. In an embodiment, block 316 includes switching from the non-P2P channel utilized at block 324 to the P2P listen channel.

In some embodiments, method 300 is terminated when a probe signal is received during block 316 or block 328. For example, if instructed to do so, the device implementing the method 300 enters GO negotiations with another P2P device when a probe signal is received from the other P2P device.

Figure 5:
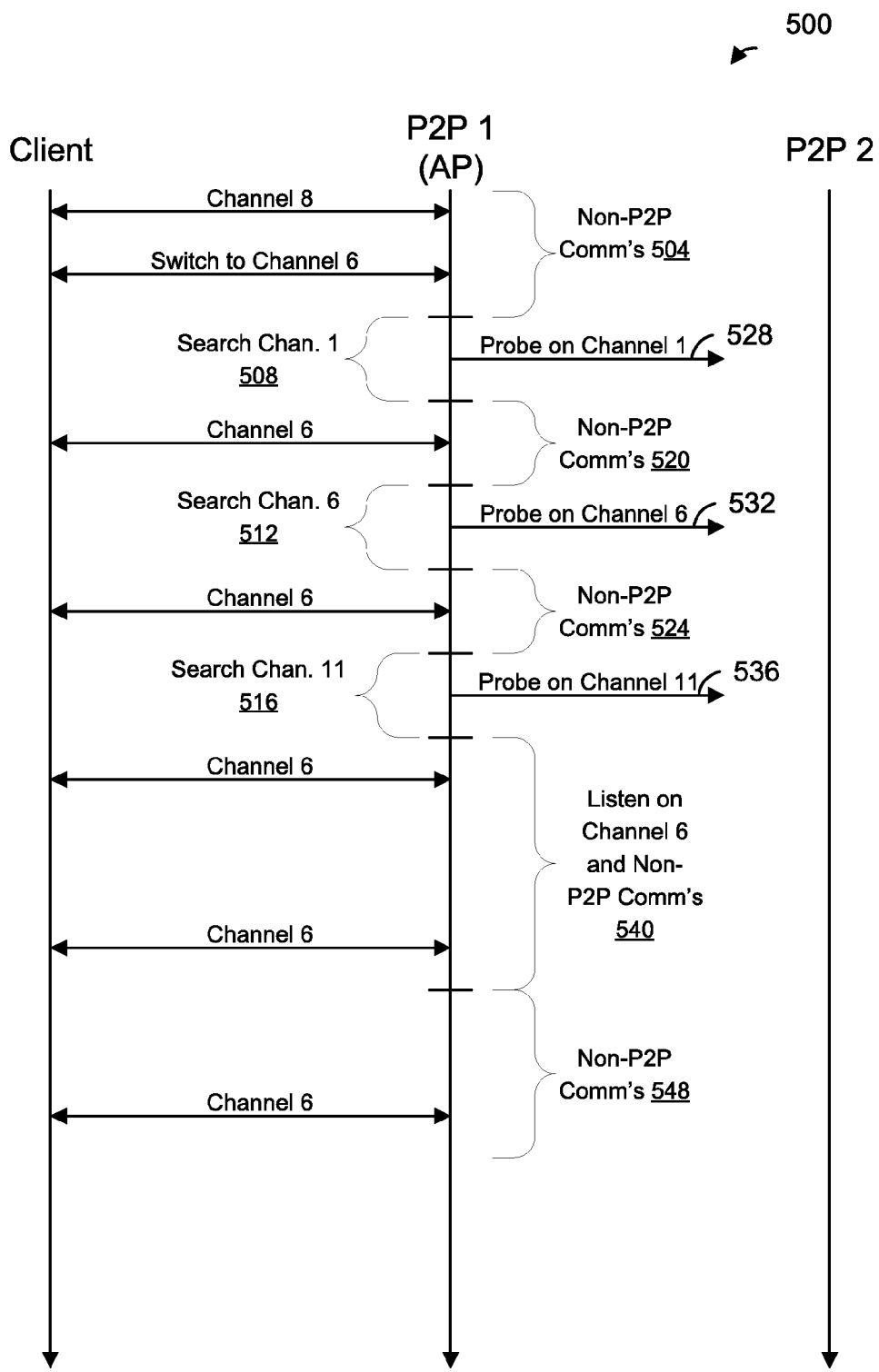
FIG. 5 is a timing diagram illustrating another example scenario of communications in the wireless communication network of FIG. 1, according to an embodiment.

FIG. 5 is a timing diagram illustrating another example scenario of communications in a wireless communication network, according to another embodiment. The example timing diagram 500 and the signals illustrated therein will be described with reference to an example communication network that is similar to network 10 of FIG. 1 for ease of explanation and illustration. However, it is noted, in light of the teachings and disclosure herein, that the communications illustrated by the example timing diagram 500 are, in various other embodiments, implemented by networks other than the network 10. Similarly, in various embodiments, network system 10 operates in a manner that generates signals and/or signal states different from those shown in the example timing diagram 500.

During time period 504, P2P1, which is an AP in some embodiments, communicates with a client station. In the example illustrated in FIG. 5, communications between P2P1 and the client take place on channel 8 and are non-P2P communications (e.g., WLAN communications). In another embodiment, the non-P2P communications between P2P1 and the client take place on a suitable channel other than channel 8. In some embodiments, the non-P2P communications include negotiations between P2P1 and the client station that will allow the client station to join a wireless network (e.g., a WLAN) managed by P2P1.

During the time period 504, it is determined that P2P1 is to attempt to discover other P2P devices by commencing a P2P discovery process. In some embodiments, in response to determining that the P2P discovery process is to commence, at least some of the techniques describes with respect to FIGS. 2-4 are utilized to determine whether/how much to delay and/or skip portions of the P2P discovery process.

Additionally, in response to determining that the P2P discovery process is to commence, P2P1 determines that the non-P2P communications with the client should continue on a different channel, and more specifically, on a P2P listen channel used for the P2P listen phase of the P2P discovery process. In example illustrated in FIG. 5, P2P1 determines that, for the non-P2P communications, the channel should be changed from channel 8 to channel 6. Additionally, P2P1 changes the channel for non-P2P communications from channel 8 to channel 6. Changing the channel includes informing the client of the channel change so that the client also changes to the appropriate channel to continue the non-P2P communications.

After time period 504, P2P1 starts a P2P search phase of the discovery process, which includes transmitting probe signals on P2P social channels and listening for responses to the probe signals from other P2P devices. For example, the search phase generally involves three time periods 508, 12, and 516. In an embodiment, the entire search phase is not over a contiguous time period. Rather, in an embodiment, the search phase is non-contiguous in time, and is interspersed with one or more time periods in which P2P1 reverts to non-P2P communications with the client. For example, non-P2P communication time periods 520 and 524 are interspersed between time P2P search phase periods 508, 512, and 516, as will be described in more detail below. This improves the ability of P2P1 to maintain the existing connection with the client and/or to decrease non-P2P communication delays occurring over the non-P2P connection during the P2P search phase, at least in some embodiments and/or scenarios.

At time period 508, P2P1, acting as part of the P2P search phase, switches to a first P2P social channel (channel 1) and transmits a probe signal 528 on channel 1 in an attempt to connect with another P2P device (e.g., P2P2). In an embodiment, P2P1 transmits the probe signal 528 at or near the beginning of the time period 508 and spends the remainder of the time period 508 listening for responses to the probe signal 528 from one or more other P2P devices (e.g., P2P2). In other embodiments, P2P1 transmits the probe signal 528 at a different time and/or transmits multiple probe signals during the time period 508. In the example scenario illustrated in FIG. 5, P2P1 does not receive a response to the probe signal 528. If, however, P2P1 receives a response to the probe signal 528 from another P2P device, such as P2P2, the process illustrated in timing diagram 500 will end. A user, a host device, etc., may then instruct one or both of P2P1 and P2P2 to enter a group owner (GO) negotiation in which P2P1 and P2P2 determine which P2P device will become the owner of a P2P group including the two devices.

After time period 508, P2P1 interrupts the search phase to perform non-P2P communications with the client during time period 520 on channel 6. For example, P2P1 switches to channel 6 so that it can transmit signals to the client and/or receive signals from the client as part of a non-P2P connection already established with the client.

After time period 520, P2P1 continues the P2P search phase. For example, P2P1 remains on channel 6 and transmits a probe signal 532 during time period 512 in an attempt to connect with another P2P device (e.g., P2P2). In an embodiment, P2P1 transmits the probe signal 532 at or near the beginning of the time period 512 and spends the remainder of the time period 512 listening for responses to the probe signal 532 from one or more other P2P devices (e.g., P2P2). In other embodiments, P2P1 transmits the probe signal 532 at a different time and/or transmits multiple probe signals during the time period 512. In the example scenario illustrated in FIG. 5, P2P1 does not receive a response to the probe signal 532. If, however, P2P1 receives a response to the probe signal 532 from another P2P device, such as P2P2, the process illustrated in timing diagram 500 will end, and the two P2P devices will enter a GO negotiation to determine which P2P device will become the owner of a P2P group including the two devices.

In an embodiment, the P2P1 defers from transmitting non-P2P communications during the period 512. In an embodiment, the P2P1 sends a signal to the client to refrain from transmitting non-P2P communications during the period 512. In other embodiments, the P2P1 continues non-P2P communications with the client during the period 512 while also listening for responses to the probe signal 532.

After time period 512, P2P1 again interrupts the search phase to perform non-P2P communications with the AP during time period 524 on channel 6.

After time period 524, P2P1 continues the P2P search phase. For example, P2P1 switches to a third social channel (Channel 11) and transmits a probe signal 536 during the time period 516 in an attempt to connect with another P2P device (e.g., P2P2). In an embodiment, P2P1 transmits the probe signal 536 at or near the beginning of the time period 516 and spends the remainder of the time period 516 listening for responses to the probe signal 536 from one or more other P2P devices (e.g., P2P2). In other embodiments, P2P1 transmits the probe signal 536 at a different time and/or transmits multiple probe signals during the time period 516. In the example scenario illustrated in FIG. 5, P2P1 does not receive a response to the probe signal 536. If, however, P2P1 receives a response to the probe signal 536 from another P2P device, such as P2P2, the process illustrated in timing diagram 500 will end, and the two P2P devices will enter a GO negotiation to determine which P2P device will become the owner of a P2P group including the two devices.

In an embodiment, after completing the search phase, P2P1 enters a listen phase. The listen phase generally involves the P2P1 switching to a predetermined social channel (channel 6 in the example illustrated in FIG. 5) and then listening for probe request signals transmitted by other P2P devices. During the listen phase, when a probe request signal is received by P2P1, P2P1 transmits a response to the probe signal. If a user, host device, etc., instructs P2P1 to do so, P2P1 then enters GO negotiations as discussed above, in some embodiments. In an embodiment, the duration of the listen phase varies. In one embodiment, the duration is pseudo-randomly determined. In some embodiments, the duration is determined such that the duration falls within a range between a minimum period and a maximum period, inclusive. In some embodiments, the duration is determined as an integer multiple of the minimum period. In an embodiment, the duration is selectable from a set of different time durations. In an embodiment, the set includes the durations: 100 ms, 200 ms, and 300 ms.

As discussed above, the P2P1 switched the channel for non-P2P communications to the P2P listen channel. During a listen phase 540, the P2P1 performs both non-P2P communications and also listens for probe signals from P2P devices. For example, during the listen phase 540, P2P1 listens for probe signals in between non-P2P communications, in an embodiment. In some embodiments, P2P1 reduces non-P2P transmissions by the P2P1 during the P2P listen phase 540.

After the listen phase is complete, P2P1 again performs non-P2P communications with the client during time period 548 on the non-P2P channel (channel 6). The length of time period 548 need not be the same as the length of any other periods discussed above, in some embodiments. In some embodiments, the search phase and listen phase are repeated when another P2P device is not discovered.

Whether to delay, skip any of, and how many, the search time periods 508, 512, and 516 is determined based on traffic levels or demands of the non-P2P connection, in an embodiment.

Similarly, in an embodiment, whether to switch the channel of non-P2P connection to the P2P listen channel is determined based on traffic levels or demands of the non-P2P connection. Similarly, in an embodiment, whether to perform non-P2P communications during the P2P listen phase is determined based on traffic levels or demands of the non-P2P connection.

Figure 6:
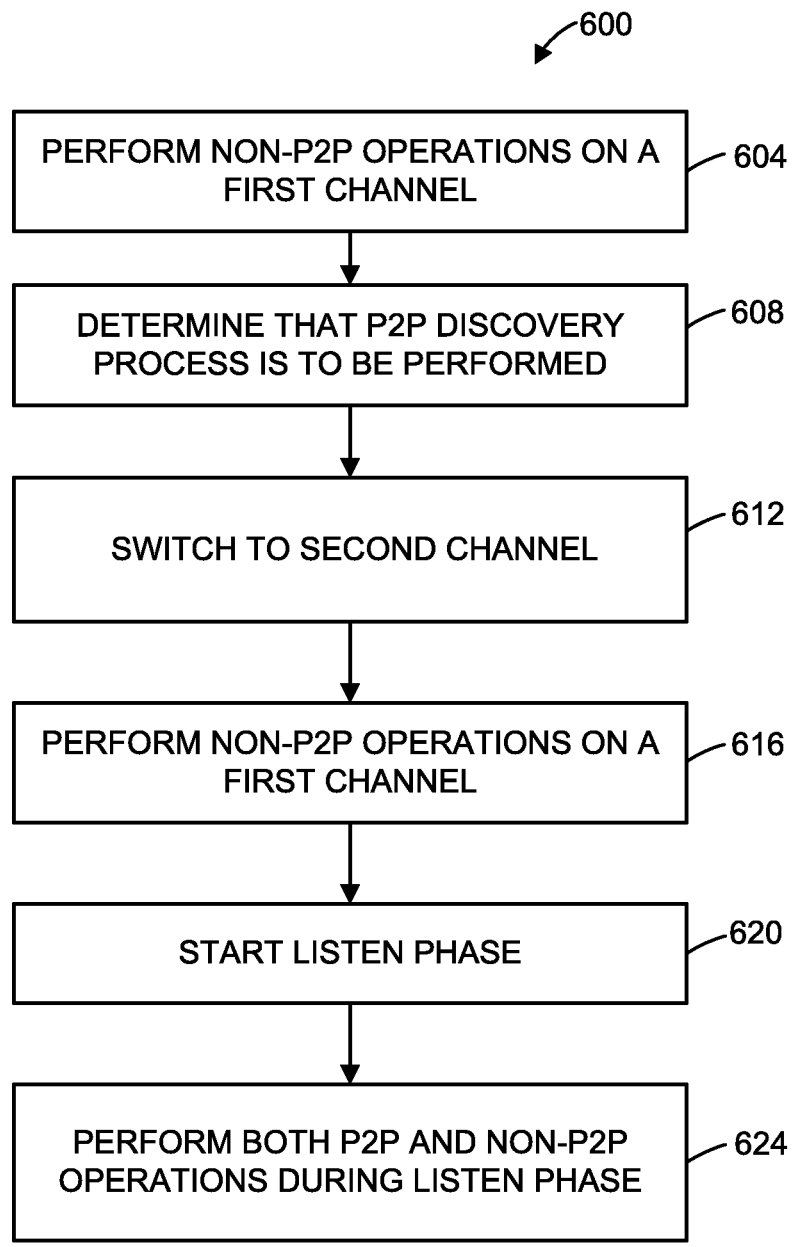
FIG. 6 is a flow diagram of an example method for performing both a portion of a P2P discovery process and non-P2P communications on the same channel, according to an embodiment.

FIG. 6 is a flow diagram of an example method 600 for performing both P2P and non-P2P operations during P2P listen time period according to the present disclosure. The method 600 is described with reference to FIG. 5 for explanatory purposes. In other embodiments and/or scenarios, the method 600 does not correspond with the time periods shown in FIG. 5.

The method 600 is performed by a communication device configured to perform both P2P and non-P2P operations, and configured to operate as an AP, at least in some circumstances. In an embodiment, the method 600 is implemented by a communication device such as the communication device 14 of FIG. 1, where the communication device is configured to be able to operate as an AP, at least in some circumstances. For example, the network interface 16 is configured to implement the method 600, in an embodiment. As another example, the network interface 16 and the host 15 are configured to implement the method 600, in an embodiment. In other embodiments, the method 600 is implemented by another suitable device.

At block 604, P2P1 performs non-P2P operations on a first channel. In an embodiment, P2P1 is acting as an AP while performing non-P2P communications with a client device. In an embodiment, the communications include data transfers between P2P1 and the client after the client has joined a WLAN managed by P2P1.

At block 608, P2P1 determines that a P2P discovery process is to be performed.

At block 612, P2P1 switches to a new communication (second channel) channel in response to determining that the P2P discovery process is to be performed. The second communication channel is a channel via which the P2P1 is configured to perform a P2P listen phase of the discovery process. In an embodiment, switching from the first channel to the second channel comprises instructing the client device to switch to the second channel. In an embodiment, switching from the first channel to the second channel comprises notifying one or more client devices in a WLAN, of which P2P1 is acting as the AP, that P2P1 (the AP) is switching to the second channel. In an embodiment, whether to switch the channel of non-P2P connection to the P2P listen channel is determined based on traffic levels or demands of the non-P2P connection.

At block 616, P2P1 non-P2P communications with the client device via channel 2 after switching channels at block 612. At block 620, P2P1 starts the P2P listen phase of the discovery process.

At block 624, during the listen phase of the P2P discovery process, P2P1 both (i) listens for P2P probe signals on the second channel, and (ii) transmits and/or receives non-P2P communications on the second channel. In an embodiment, P2P1 listens for P2P probe signals on the second channel in between non-P2P transmissions and received non-P2P communications on the second channel. In some embodiments, P2P1 reduces non-P2P transmissions by the P2P1 during the P2P listen phase. In an embodiment, whether to perform non-P2P communications during the P2P listen phase is determined based on traffic levels or demands of the non-P2P connection.

At least some of the various blocks, operations, and techniques described above may be implemented utilizing hardware, a processor executing firmware instructions, a processor executing software instructions, or any combination thereof. Also, some of the various blocks, operations, and techniques may be performed in a different order (and/or concurrently) and still achieve desirable results. When implemented utilizing a processor executing software or firmware instructions, the software or firmware instructions may be stored in any non-transient, tangible, computer readable medium such as a magnetic disk, an optical disk, a RAM, a ROM, a flash memory, etc. The software or firmware instructions may include machine readable instructions that, when executed by a processor, cause the processor to perform various acts. The processor is coupled to the computer readable medium, in an embodiment.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
    determining, with a communication device, that a peer-to-peer (P2P) discovery process is to commence, wherein the P2P discovery process is for the communication device to discover one or more other communication devices capable of P2P communications;
    after determining that the P2P discovery process is to commence, at least one of
        (i) delaying, with the communication device, at least a portion of the P2P discovery process to permit communication, by the communication device, via a non-P2P communication link, or
        (ii) not performing at least a portion of the P2P discovery process to permit communication, by the communication device, via the non-P2P communication link;
    during a time period that, prior to the act of delaying or deciding not to perform, would have been allocated for the P2P discovery process, performing communications, with the communication device, via the non-P2P communication link;
    allocating, with the communication device, a first portion of a listen time period of the P2P discovery process, wherein the listen time period of the P2P discovery process is allocated for the communication device (i) to listen, on a first channel, for one or more probes, when transmitted, from one or more other communication devices capable of P2P communications, and (ii) to transmit, via the first channel, one or more responses to the one or more probes on the first channel;
    allocating, with the communication device, a second portion of the listen time period of the P2P discovery process;
    allocating, with the communication device, at least one non-P2P communication time period between (i) the first portion of the listen time period and (ii) the second portion of the listen time period;
    listening, with the communication device, for one or more probes received via the first channel during the first portion of the listen time period of the P2P discovery process, wherein the one or more probes are transmitted by one or more other communication devices capable of P2P communications;
    at least one of (i) transmitting or (ii) receiving, with the communication device, via the non-P2P communication link during the at least one non-P2P communication time period;
    listening, with the communication device, for one or more probes received via the first channel during the second portion of the listen time period of the P2P discovery process, wherein the one or more probes, when transmitted, are from one or more other communication devices capable of P2P communications; and
    in response to one or more probes received, via the first channel, during the second portion of the listen time period of the P2P discovery process, transmitting, with the communication device, one or more responses via the first channel.

2. A method according to claim 1, further comprising monitoring traffic demands of the non-P2P communication link;
    wherein delaying or not performing at least a portion of the P2P discovery process is based on the traffic demands on the non-P2P communication link.

3. A method according to claim 1, further comprising:
    allocating, with the communication device, a first portion of a P2P search time period of the P2P discovery process, wherein the first portion of the P2P search time period is allocated for the communication device (i) to transmit one or more probes on a second channel, and (ii) to listen, on the second channel, for one or more first responses to the one or more probes on the second channel, the one or more first responses, when transmitted, from one or more other communication devices capable of P2P communications;
    allocating, with the communication device, a second portion of the P2P search time period of the P2P discovery process, wherein the second portion of the P2P search time period is allocated for the communication device (i) to transmit one or more probes on a third channel, and (ii) to listen, on the third channel, for one or more second responses to the one or more probes on the third channel, the one or more second responses, when transmitted, from one or more other communication devices capable of P2P communications; and
    allocating, with the communication device, at least one non-P2P communication time period, during the time period that was scheduled for the P2P discovery process, between (i) the first portion of the P2P search time period and, (ii) the second portion of the P2P search time period of the P2P discovery process.

4. A communication device, comprising:
    a network interface having one or more integrated circuit devices configured to
        determine that a peer-to-peer (P2P) discovery process is to commence, wherein the P2P discovery process is for the communication device to discover one or more other communication devices capable of P2P communications,
        after determining that the P2P discovery process is to commence, at least one of (i) delay at least a portion of the P2P discovery process to permit communication, by the communication device, via a non-P2P communication link, or (ii) not perform at least a portion of the P2P discovery process to permit communication, by the communication device, via the non-P2P communication link, during a time period that, prior to the act of delaying or deciding not to perform, would have been allocated for the P2P discovery process, perform communications via the non-P2P communication link, allocate a first portion of a listen time period of the P2P discovery process, wherein the listen time period of the P2P discovery process is allocated for the communication device (i) to listen, on a first channel, for one or more probes, when transmitted, from one or more other communication devices capable of P2P communications, and (ii) to transmit, via the first channel, one or more responses to the one or more probes on the first channel, allocate a second portion of the listen time period of the P2P discovery process, allocate at least one non-P2P communication time period between (i) the first portion of the listen time period and (ii) the second portion of the listen time period, listen for one or more probes received via the first channel during the first portion of the listen time period of the P2P discovery process, wherein the one or more probes are transmitted by one or more other communication devices capable of P2P communications, at least one of (i) transmit or (ii) receive, via the non-P2P communication link, during the at least one non-P2P communication time period, listen for one or more probes received via the first channel during the second portion of the listen time period of the P2P discovery process, wherein the one or more probes, when transmitted, are from one or more other communication devices capable of P2P communications, and in response to one or more probes received, via the first channel, during the second portion of the listen time period of the P2P discovery process, transmit one or more responses via the first channel.

5. A communication device according to claim 4, wherein the one or more integrated circuit devices are configured to:
monitor traffic demands of the non-P2P communication link; and
delay or not perform at least a portion of the P2P discovery process based on the traffic demands on the non-P2P communication link.

6. A communication device according to claim 4, wherein the one or more integrated circuit devices are configured to:
allocate a first portion of a P2P search time period of the P2P discovery process, wherein the first portion of the P2P search time period is allocated for the communication device (i) to transmit one or more probes on a second channel, and (ii) to listen, on the second channel, for one or more first responses to the one or more probes on the second channel, the one or more first responses, when transmitted, from one or more other communication devices capable of P2P communications;
allocate a second portion of the P2P search time period of the P2P discovery process, wherein the second portion of the P2P search time period is allocated for the communication device (i) to transmit one or more probes on a third channel, and (ii) to listen, on the third channel, for one or more second responses to the one or more probes on the third channel, the one or more second responses, when transmitted, from one or more other communication devices capable of P2P communications; and allocate at least one non-P2P communication time period, during the time period that was scheduled for the P2P discovery process, between (i) the first portion of the P2P search time period and, (ii) the second portion of the P2P search time period of the P2P discovery process.

7. A method according to claim 1, further comprising:
determining a length of the listen time period of the P2P discovery process,
wherein the first portion of the listen time period and the second portion of the listen time period are allocated such that an aggregate length of (i) the first portion of the listen time period and (ii) the second portion of the listen time period is less than or equal to the determined length of the listen time period.

8. A method according to claim 1, further comprising:
allocating, with the communication device, a first portion of a search time period of the P2P discovery process, wherein the first portion of the search time period of the P2P discovery process is allocated for the communication device (i) to transmit one or more probes via a first search channel, and (ii) to listen for one or more responses, received via the first search channel, that are responsive to the one or more probes transmitted via the first search channel;
allocating, with the communication device, a second portion of a search time period of the P2P discovery process, wherein the second portion of the search time period of the P2P discovery process is allocated for the communication device (i) to transmit one or more probes via a second search channel, and (ii) to listen for one or more responses, received via the second search channel, that are responsive to the one or more probes transmitted via the second search channel;
allocating, with the communication device, at least one non-P2P communication time period between (i) the first portion of the search time period and (ii) the second portion of the search time period;
transmitting, with the communication device, one or more probes via the first search channel during the first portion of the search time period of the P2P discovery process;
at least one of (i) transmitting or (ii) receiving, with the communication device, via the non-P2P communication link during the at least one non-P2P communication time period; and
transmitting, with the communication device, one or more probes via the second search channel during the second portion of the search time period of the P2P discovery process.

9. A communication device according to claim 4, wherein the one or more integrated circuit devices are further configured to:
determine a length of the listen time period of the P2P discovery process,
wherein the first portion of the listen time period and the second portion of the listen time period are allocated such that an aggregate length of (i) the first portion of the listen time period and (ii) the second portion of the listen time period is less than or equal to the determined length of the listen time period.

10. A communication device according to claim 4, wherein the one or more integrated circuit devices are further configured to:
allocate a first portion of a search time period of the P2P discovery process, wherein the first portion of the search time period of the P2P discovery process is allocated for the communication device (i) to transmit one or more probes via a first search channel, and (ii) to listen for one or more responses, received via the first search channel, that are responsive to the one or more probes transmitted via the first search channel;

allocate a second portion of a search time period of the P2P discovery process, wherein the second portion of the search time period of the P2P discovery process is allocated for the communication device (i) to transmit one or more probes via a second search channel, and (ii) to listen for one or more responses, received via the second search channel, that are responsive to the one or more probes transmitted via the second search channel;

allocate at least one non-P2P communication time period between (i) the first portion of the search time period and (ii) the second portion of the search time period;

transmit one or more probes via the first search channel during the first portion of the search time period of the P2P discovery process;

at least one of (i) transmit or (ii) receive via the non-P2P communication link during the at least one non-P2P communication time period; and transmit one or more probes via the second search channel during the second portion of the search time period of the P2P discovery process.

11. A tangible, non-transitory computer readable medium, or media, storing machine readable instructions that, when executed by one or more processors, cause the one or more processors to:

determine that a peer-to-peer (P2P) discovery process is to commence, wherein the P2P discovery process is for a communication device to discover one or more other communication devices capable of P2P communications;

after determining that the P2P discovery process is to commence, at least one of (i) delay at least a portion of the P2P discovery process to permit communication, by the communication device, via a non-P2P communication link, or (ii) cause the communication device to not perform at least a portion of the P2P discovery process to permit communication, by the communication device, via the non-P2P communication link;

during a time period that, prior to the act of delaying or deciding not to perform, would have been allocated for the P2P discovery process, cause the communication device to perform communications via the non-P2P communication link;

allocate a first portion of a listen time period of the P2P discovery process, wherein the listen time period of the P2P discovery process is allocated for the communication device (i) to listen, on a first channel, for one or more probes, when transmitted, from one or more other communication devices capable of P2P communications, and (ii) to transmit, via the first channel, one or more responses to the one or more probes on the first channel;

allocate a second portion of the listen time period of the P2P discovery process;

allocate at least one non-P2P communication time period between (i) the first portion of the listen time period and (ii) the second portion of the listen time period;

cause the communication device to listen for one or more probes received via the first channel during the first portion of the listen time period of the P2P discovery process, wherein the one or more probes are transmitted by one or more other communication devices capable of P2P communications;

cause the communication device to at least one of (i) transmit or (ii) receive via the non-P2P communication link during the at least one non-P2P communication time period;

cause the communication device to listen for one or more probes received via the first channel during the second portion of the listen time period of the P2P discovery process, wherein the one or more probes, when transmitted, are from one or more other communication devices capable of P2P communications; and in response to one or more probes received, via the first channel, during the second portion of the listen time period of the P2P discovery process, cause the communication device to transmit one or more responses via the first channel.

12. A tangible, non-transitory computer readable medium, or media, according to claim 11, further storing machine readable instructions that, when executed by the one or more processors, cause the one or more processors to:

monitor traffic demands of the non-P2P communication link; and delay, or cause the communication device to not perform, at least a portion of the P2P discovery process based on the traffic demands on the non-P2P communication link.

13. A tangible, non-transitory computer readable medium, or media, according to claim 11, further storing machine readable instructions that, when executed by the one or more processors, cause the one or more processors to:

allocate a first portion of a P2P search time period of the P2P discovery process, wherein the first portion of the P2P search time period is allocated for the communication device (i) to transmit one or more probes on a second channel, and (ii) to listen, on the second channel, for one or more first responses to the one or more probes on the second channel, the one or more first responses, when transmitted, from one or more other communication devices capable of P2P communications;

allocate a second portion of the P2P search time period of the P2P discovery process, wherein the second portion of the P2P search time period is allocated for the communication device (i) to transmit one or more probes on a third channel, and (ii) to listen, on the third channel, for one or more second responses to the one or more probes on the third channel, the one or more second responses, when transmitted, from one or more other communication devices capable of P2P communications; and allocate at least one non-P2P communication time period, during the time period that was scheduled for the P2P discovery process, between (i) the first portion of the P2P search time period and, (ii) the second portion of the P2P search time period of the P2P discovery process.

14. A tangible, non-transitory computer readable medium, or media, according to claim 11, further storing machine readable instructions that, when executed by the one or more processors, cause the one or more processors to:

determine a length of the listen time period of the P2P discovery process, wherein the first portion of the listen time period and the second portion of the listen time period are allocated such that an aggregate length of (i) the first portion of the listen time period and (ii) the second portion of the listen time period is less than or equal to the determined length of the listen time period.

* * * * *